Dec. 3, 1957     R. V. SMITH     2,815,040
PRESSURE RELIEF VALVE
Filed Jan. 13, 1954

Inventor:
Ronald V. Smith
by his Attorneys
Howson & Howson

United States Patent Office 2,815,040
Patented Dec. 3, 1957

2,815,040

PRESSURE RELIEF VALVE

Ronald V. Smith, Pennsauken, N. J., assignor to J. E. Lonergan Company, Philadelphia, Pa., a corporation of Pennsylvania Application January 13, 1954, Serial No. 403,745

6 Claims. (Cl. 137—469)

The present invention relates to pressure relief valves and more particularly to a valve which accurately finds its seat when the pressure in the inlet nozzle falls to within a safe range.

In prior valves of this character, the valve element is slidably mounted in a tubular casing which guides it to proper position on the valve seat. After prolonged periods of operation, however, the interior surface of the tubular casing which encloses the valve element accumulates a coating or scale from the fluids passing through the valve. This coating causes the valve element to stick to the casing and retard the "popping" action of the valve. In addition to delaying the "pop-off," the sticking also delays reseating of the valve element when the pressure falls to a safe value. When the valve sticks, it is necessary to disconnect the fluid supply, dismantle the valve, and clean or replace the coated parts. Not infrequently, the delay in action is not detected and the valve is maintained in operation although it permits pressures in excess of the prescribed level.

With the foregoing in mind, a primary object of the present invention is to provide an improved pressure relief valve in which the valve element accurately finds its seat when the pressure in the intake thereof falls below a given value.

Another object of the present invention is to provide a relief valve which operates smoothly and freely without sticking after prolonged periods of use.

The invention also contemplates a novel relief valve which is of simplified design and is fully efficient and effective in operation and use.

These and other objects of the present invention and the various features and details of the construction and operation thereof are more fully set forth hereinafter with reference to the accompanying drawing in which.

Figure 1:
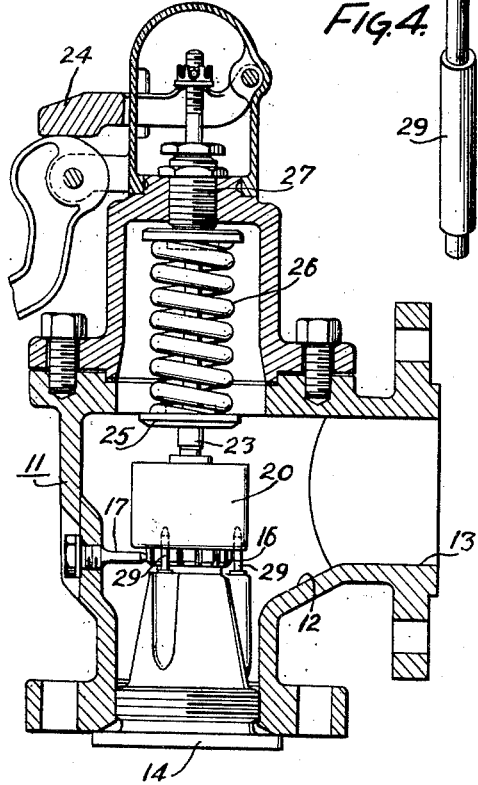
Fig. 1 is a vertical transverse sectional view of a valve made in accordance with the present invention.
Figure 4:
Fig. 4 is a detached perspective view of a finger element of the valve illustrated in Fig. 1; and, Fig. 5 is a fragmentary sectional view similar to Fig. 3 illustrating a modified form of the invention.

Referring now to the drawing, the valve comprises a vertically movable valve element which is mounted for seating engagement against the upper extremity of the intake nozzle of the valve. In accordance with the present invention, the valve element is free for limited lateral movement when it is displaced from its seat, but is accurately positioned on its seat by finger elements when the pressure within the intake nozzle falls below a predetermined value.

Figure 2:
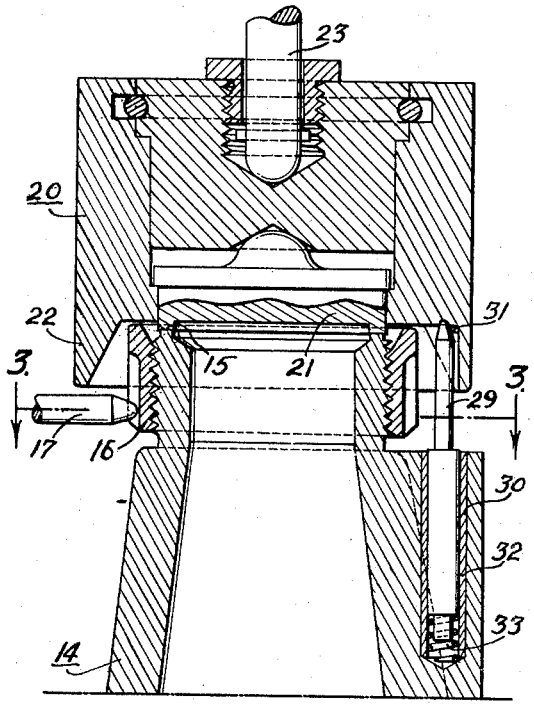
Fig. 2 is an enlarged transverse sectional view through the valve intake nozzle and the valve element.

In the illustrated embodiment of the invention, the valve comprises a casing 11 defining a main body portion 12 which is in fluid communication with an exhaust port 13. An intake nozzle 14 is mounted in the casing 11 and serves to introduce the fluid into the body portion 12 of the valve. As shown in Fig. 2, the nozzle projects upwardly into the interior of the body portion 12 and terminates at its upper end in a valve seat 15. An adjustable warn ring 16 encircles the valve seat 15 to assist in initial "pop-off" of the valve and reduce impact on the valve seat when the valve closes. A pin 17 is threaded into the casing 11 to engage in grooves of the warn ring 16 and prevent rotation thereof from the position to which adjusted.

The valve element is indicated generally by the reference numeral 20 and comprises a disc 21 which accurately seats on the valve seat 15 when the valve is closed. The element 20 is provided about its lower peripheral edge with a continuous skirt or flange 22 which, when the valve is closed, embraces the warn ring 16, as illustrated in Fig. 2. The valve element 20 is biased into engagement with the nozzle 14 by means of a rod 23 which projects upwardly through the casing 11 into engagement at its upper end with a manual release lever 24. The rod 23 has fixed thereto a washer 25 which forms a seat for the lower extremity of a compression spring 26, the upper end of which is engaged by an adjusting screw 27 threaded into the valve casing 11. In this manner, the rod 23 is biased downwardly with a predetermined force as determined by the strength of the spring 26 and the adjustment of the screw 27. Thus, the valve element 20 is retained on its seat 15 until the pressure in the bore of the nozzle 14 is sufficient to overcome the bias of the spring 26 on the rod 23. When the pressure in the bore of the nozzle is sufficient, it displaces the valve element 20 from its seat, and the element remains elevated until the pressure adjacent the inner extremity of the nozzle falls below the predetermined safe value.

In accordance with the invention, means is provided to direct the valve element to its proper location on the seat 15 when the pressure adjacent the inner extremity of the nozzle falls below the predetermined value. In the illustrated embodiment of the invention, three fingers 29 are provided which are arranged circumferentially about the nozzle 14 and project upwardly therefrom for engagement with the valve element 20. To insure proper positioning of the valve element concentrically upon the valve seat, the flange 22 thereof is beveled and provided with recesses to register with the fingers 29 as indicated at 31.

Each of the fingers 29 is slidably mounted for vertical movement relative to the nozzle 14 and to this end, a plurality of bores 30 are formed about the circumference of the nozzle 14. Each finger 29 is slidably mounted in a bushing 32 inset in the bore 30 and is biased upwardly by a spring 33 which seats at one end against the finger and at the other end against the bottom of the bore 30. Thus, when the valve element 20 is closed, it is seated against the pressure of the spring 33 into firm engagement with the valve seat 15. When the pressure within the nozzle exceeds the predetermined maximum value, the valve element 20 pops off. When the valve element 20 is raised above the seat, the fingers do not follow the valve element to its upper limit position but are retained within the bushing 32 by the pressure of the fluid escaping through the nozzle 14 against their upper exposed surfaces.

When the pressure again falls below the predetermined value, the valve element 20 returns to its seat. Prior to its engaging the seat, the beveled skirt or flange of the valve engages the fingers 29 which accurately position the valve element laterally so that it seats concentrically on the valve seat 15. This novel valve structure affords continuous operation of the valve without sticking. The upwardly projecting fingers are interposed in the direct stream of fluid escaping from the nozzle 14, which aids in maintaining them free from scale or other coatings which cause the valve to stick. In addition, the area of engagement between the fingers and the valve element is relatively small so that any coating that might adhere to the fingers would not adversely affect the operation of the pressure relief valve.

Figure 5:
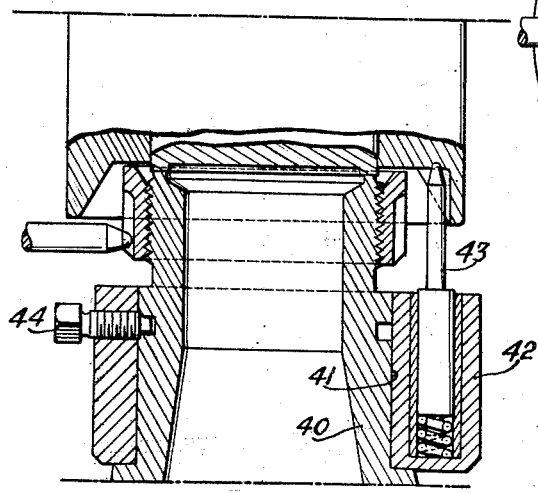
Figure 3:
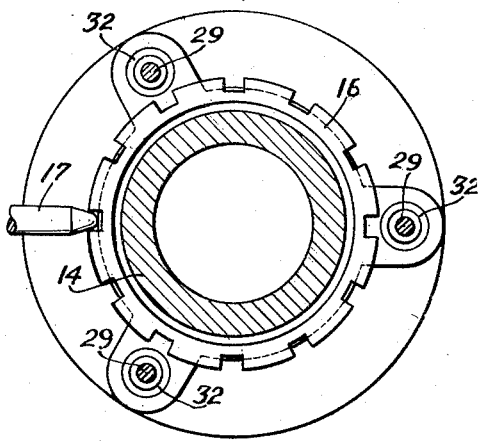
Fig. 3 is a horizontal sectional view taken on the line 3—3 of Fig. 2.

A modified form of the invention is illustrated in Fig. 5 which shows an embodiment which may be applied to existing valves. The upper end of the nozzle 40 is cut out as indicated at 41 to receive a ring 42 having fingers 43 which are constructed and function in the same manner as the fingers 29. A lock screw 44 is provided in the ring 42 to prevent displacement of the ring from the nozzle 40. The structure and the function of the remaining parts of the valve are identical to the previously described embodiment and need not be repeated.

While particular embodiments of the invention have been herein illustrated and described, it is not intended to limit the invention to such disclosures, and changes and modifications may be made therein and thereto within the scope of the following claims.

I claim:

1. In a pressure relief valve having a casing, an intake nozzle in the casing defining a valve seat at its inner end, a valve element movable axially of said nozzle between closed and open limit positions into and out of sealing engagement with said valve seat, respectively, means to bias the valve element into engagement with the seat, a finger element slidably mounted adjacent the inner end of the nozzle for movement in a direction axially thereof between inner and outer limit positions, said finger element in its inner limit position being engaged against said valve element in its closed limit position, and having means whereby in its outer limit position, it is disengaged from said valve element in the open limit position thereof, said finger element engageable with the valve element as the latter approaches said valve seat, and recess means on said valve element in registry and cooperable with said finger element upon engagement of said elements to displace said finger element to its inner limit position under the action of said bias means, thereby to direct said valve element substantially coaxially of the nozzle into sealing engagement with said valve seat.

2. In a pressure relief valve having a casing, an intake nozzle in the casing defining a valve seat at its inner end, a valve element movable axially of said nozzle between closed and open limit positions into and out of sealing engagement with said valve seat, respectively, means to bias said valve element into engagement with the seat, at least one finger element slidably mounted adjacent the inner extremity of the nozzle for movement in a direction axially thereof and between inner and outer limit positions, said finger element in its inner limit position being engaged against said valve element in its closed limit position, and having means whereby in its outer limit position, it is disengaged from said valve element in the open limit position thereof, said finger element engageable wth the valve element, means biasing said finger element into engagement with the valve element as the latter approaches said valve seat, and recess means on said valve element in registry and cooperable with said finger element upon engagement of said elements to displace said finger element to its inner limit position under the action of said bias means, thereby to direct the element substantially coaxially of the nozzle into sealing engagement with said valve seat.

3. In a pressure relief valve having a casing, an intake nozzle in the casing defining a valve seat at its inner end, a valve element movable axially of said nozzle between closed and open limit position into and out of sealing engagement with said valve seat, respectively, means to bias said valve element into engagement with the valve seat, a plurality of finger elements slidably mounted in spaced circumferential relation adjacent the inner extremity of the nozzle for movement in a direction axially thereof between inner and outer limit positions, said finger elements in their inner limit positions engaged against said valve element in its closed limit position, and having means whereby in their outer limit positions they are disengaged from said valve element in the open limit position thereof, said finger elements engageable with the valve element as the latter approaches said valve seat, and recess means on said valve element in registry and cooperable with said finger elements upon engagement of said elements to displace said finger elements to their inner limit position under the action of said bias means, thereby to direct the element substantially coaxially of the nozzle into sealing engagement with said valve seat.

4. In a pressure relief valve having a casing, an intake nozzle in the casing defining a valve seat at its inner end, a valve element movable axially of said nozzle between closed and open limit positions into and out of sealing engagement with said valve seat, respectively, means to bias said valve element into engagement with the valve, a plurality of fingers slidably mounted in spaced circumferential relation adjacent the inner extremity of the nozzle for movement in a direction axially thereof between inner and outer limit positions, said fingers in their limit positions engaged against said valve elements in its closed limit position, and having means whereby in their outer limit positions they are disengaged from said valve element in the open limit position thereof, means defining a plurality of recesses in the valve element, and means biasing said fingers into said recesses as the valve element approaches said valve seat to direct the valve element coaxially of the nozzle into sealing engagement with said valve seat.

5. A pressure relief valve according to claim 4 wherein said nozzle is provided with a plurality of substantially axial bores open at their inner extremities to receive the individual fingers and wherein further said means to bias the fingers comprises a spring in each said bore seated at one end against the outer extremity of the bore and at the other end against the outer extremity of each said finger element.

6. A pressure relief valve according to claim 4 including an annular ring removably mounted adjacent the inner extremity of said nozzle and formed with a plurality of substantially axial bores open at their inner extremities to receive the individual fingers, and wherein further the means for biasing said fingers comprises a plurality of springs each seated at one end against the outer extremity of one of said bores and at the other end against the outer extremity of said finger element.

References Cited in the file of this patent

UNITED STATES PATENTS

| | | |
|---|---|---|
| 563,371 | Gold | July 7, 1896 |
| 2,249,180 | Scully | July 15, 1941 |
| 2,622,613 | McNeal | Dec. 23, 1952 |